T. L. FAWICK.
GATE.
APPLICATION FILED JAN. 21, 1916.
1,257,333.
Patented Feb. 26, 1918.
2 SHEETS—SHEET 1.
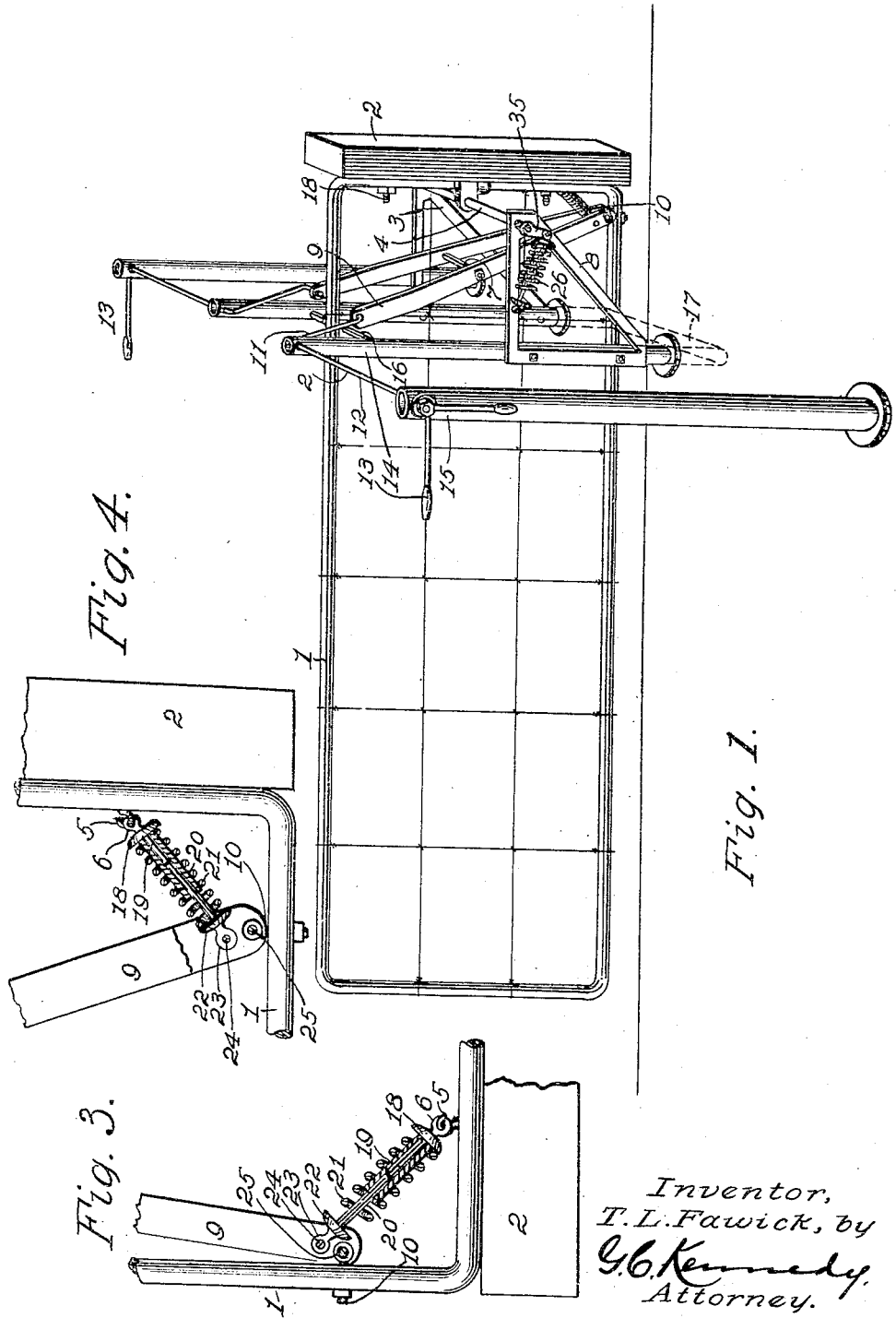
Inventor,
T. L. Fawick, by
G. C. Kennedy,
Attorney.

T. L. FAWICK.
GATE.
APPLICATION FILED JAN. 21, 1916.
1,257,333.
Patented Feb. 26, 1918.
2 SHEETS—SHEET 2.
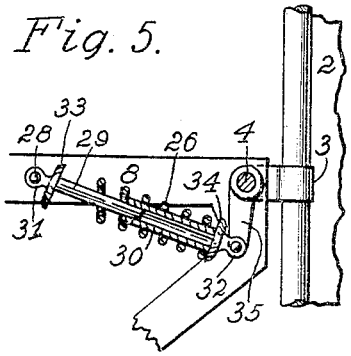
Fig. 5.
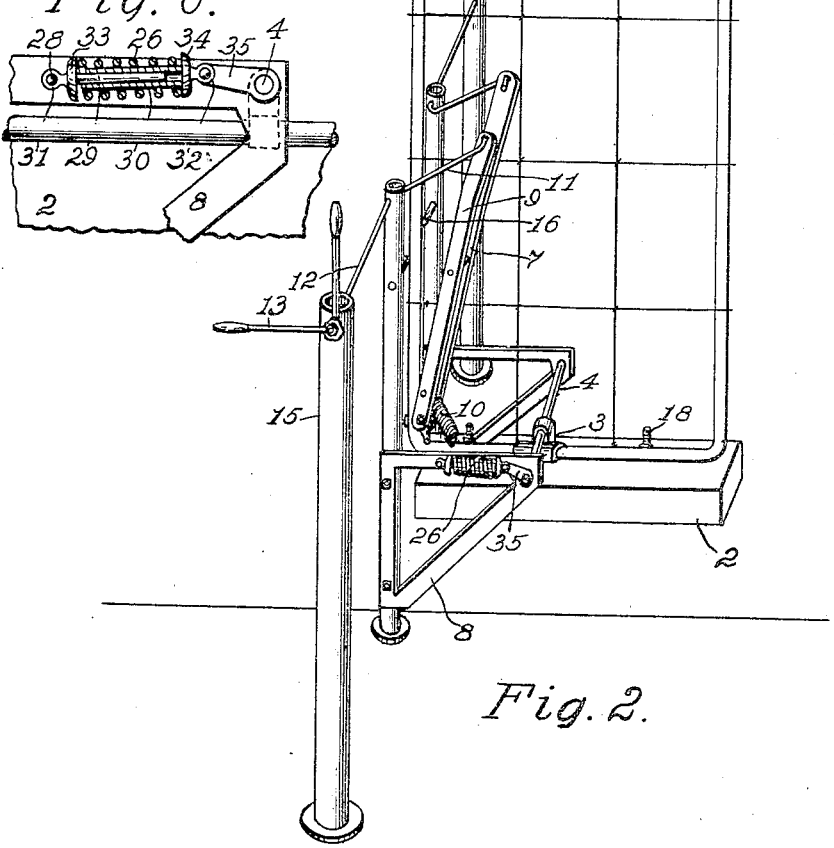
Fig. 6.
Fig. 2.
Inventor,
T. L. Fawick, by
G. C. Kennedy,
Attorney.

UNITED STATES PATENT OFFICE.

THOMAS LEVI FAWICK, OF WATERLOO, IOWA.

GATE.

1,257,333.

Specification of Letters Patent.  Patented Feb. 26, 1918.

Application filed January 21, 1916. Serial No. 73,289.

*To all whom it may concern:*

Be it known that I, THOMAS LEVI FAWICK, a citizen of the United States of America, and a resident of Waterloo, Blackhawk county, Iowa, have invented certain new and useful Improvements in Gates, of which the following is a specification.

My invention relates to improvements in gates, and the object of the improvement is to furnish a tiltable gate supplied with mechanism for rocking it either up or down, and having means adapted to yieldably resiliently cushion it at either limit of its movement and thus hold it in a releasably secured position at either limit.

This object I have accomplished by the means which are hereinafter described and claimed, and which are illustrated in the accompanying drawings, in which—

Figure 1 is a perspective view of my improved tiltable gate in its lowered or closed position.

Fig. 2 is a like perspective view of said gate, showing it in its raised position.

Figs. 3 and 4 are detail views of the spring-connection for yieldably resiliently cushioning and securing the gate in its closed position, and Figs. 5 and 6 are detail views of other spring-connections likewise adapted to yieldably cushion and releasably secure the gate in its raised position.

Similar numerals of reference denote corresponding parts throughout the several views.

The gate may be of any desired form or dimensions, but, as shown has a tubular frame 1 interlaced with wires. Upon the rear standard or upright of the frame a counterbalance weight, 2, which may be of concrete or other material, is secured by the bolts 18, and serves to balance the longer part of the gate which extends forwardly beyond the bearings of the gate.

Alined posts placed transversely to the gate are fixed in the ground, the inner pair 14 having a cross-connection 17 embedded in the ground to give these posts a firm seat therein to thereby fixedly resist the thrust of the moving gate which is located medially between these posts. These inner posts 14 have fixed brackets 8 extending rearwardly and parallel to each other and provided at their rear ends with alined bearing-openings which receive the ends of a rock-shaft 4 carrying a medial fixed sleeve 3 mounted fixedly on the middle of the rear stile of the gate frame 1. The outer posts 15 as well as the inner posts 14, have alined orifices to seat rock-shafts 12 on whose adjacent ends between the posts 14 are rearwardly directed cranks 11. On the outer ends of the rock-shafts 12 are fixed pairs of handles 13 set at 90 degrees from each other for convenience in rocking the shaft and the gate 1 to either an open or closed position. A pair of inclined bars 9 are secured together by cross-rods 7 and 24 and have their upper ends pivoted on crank pins on said cranks 11. The bars 9 converge toward their lower ends and are connected by a cross-bar 25 pivotally mounted in the eye of an eye-bolt 10 secured in the lower part of the frame 1 near its lower right-hand angle.

The numeral 16 denotes alined pins projecting toward each other from the inner side of the posts 14 to serve as stops for the bars 9 to limit their forward movement beyond the dead center position thereof shown in said Fig. 1.

Referring now to Figs. 3 and 4, a compression spring 21 is mounted between disks 22 and 18 on eyes 23 and 6, the eye 23 being pivoted on a cross rod 24 of the bars 9, and the eye 6 being pivotally connected to the hook 5 fixed in the rear stile of the gate. An integral socket 19 on the disk 18 slidably receives an integral pin 20 on the disk 22 within said spring.

Referring now to Figs. 5 and 6, a like compression 26 is mounted between disks 33 and 34 on eyes 31 and 32, the eye 31 being pivoted on a pin 28 projecting from one of the brackets 8. On an end of the rock-shaft 4 is fixed a short arm 35 having a crank pin to which the eye 32 is pivotally connected. The disk 34 has a socket 30 in which a pin 29 extending integrally from the disk 33 is slidable within said spring 26.

Operation:

To raise the gate 1 from its closed position, either handle 13 may be rocked downwardly to rock the shafts 12 and swing the cranks 11 upwardly with the connected bars 9 to the positions shown in said Fig. 2, the bars 9 acting to swing the gate 1 to its raised position. Referring to Figs. 5 and 6, Fig. 5 shows the spring 26 uncompressed when the gate is in its closed or lowered position since the length of the spring is considerably less than the distance between the disks 33 and 34. When the gate is swung upwardly through about three-fourths of its arc of movement, the spring 26 begins to be compressed between said disks, thus cushioning the gate at the last part of its upward movement. Fig. 6 shows that at the end of the upward movement of the gate, the pin on the crank 35 is passed upwardly beyond its dead center, thus releasably securing the gate in its raised position. To lower the gate, either of the handles 13 on either post 15 may be rocked upwardly, thus causing the cranks 11 to be swung downwardly, which through the action of the connecting-bars 9 swings the gate 1 downwardly.

Referring to Figs. 3 and 4, Fig. 3 shows the uncompressed condition of the spring 21 at the beginning of the downward movement of the gate. When the gate has swung downwardly through about three-fourths of its arc of movement, the spring 21 begins to be compressed between the disks 18 and 22, thus cushioning the gate resiliently toward the end of its downward movement. The compressed spring 21 pushes the bars 9 forwardly to their dead center position, thus releasably securing the gate in its lowered position. The gate cannot be manually lifted by taking hold of its frame 1, since the result would be to thrust the bars 9 against the stops 16, preventing upward movement of the gate. The alined posts 14 and 15 may be arranged in any fence gap or in any desired relation to a roadway.

Having described my invention, what I claim as new, and desire to secure by Letters Patent, is:

1. The combination with supporting-means, of a gate, a rock-shaft mounted in said supporting-means and having a crank, a link having one end pivoted to one end of said crank, and having its other end pivoted to the rear lower angle of the gate, the rear end of the gate being tiltably mounted on said supporting-means, and a coiled spring connected between the rear end of the gate and the lower part of said link.

2. The combination with supporting-means, of a gate, a rock-shaft mounted in said supporting-means and having a crank, a link having one end pivoted to one end of said crank and having its other end pivoted to the rear lower angle of the gate, the gate being tiltably mounted on said supporting-means, and a coiled spring connected between the rear end of said gate and the said supporting-means.

3. The combination with spaced posts, of a gate located transversely between them, alined rock-shafts mounted on said posts and having cranks on each end, a pair of like links pivoted to the rear lower corner of said gate, and having their other ends pivoted on the inner cranks of said rock-shafts, a coiled spring connected between said links and the rear end of the gate, a coiled spring connected between the gate and a fixed support, stops for said links to limit movement of the gate in one direction, and a counterbalance weight mounted on the rear end of the gate.

Signed at Waterloo, Iowa, this 18th day of January, 1916.

THOMAS LEVI FAWICK.

Witnesses:
PEARL M. STANTON,
GEO. C. KENNEDY.

Copies of this patent may be obtained for five cents each, by addressing the "Commissioner of Patents, Washington, D. C."